F. E. EDELBROCK.
HARNESS SADDLE.
APPLICATION FILED DEC. 17, 1907.
911,299.
Patented Feb. 2, 1909.
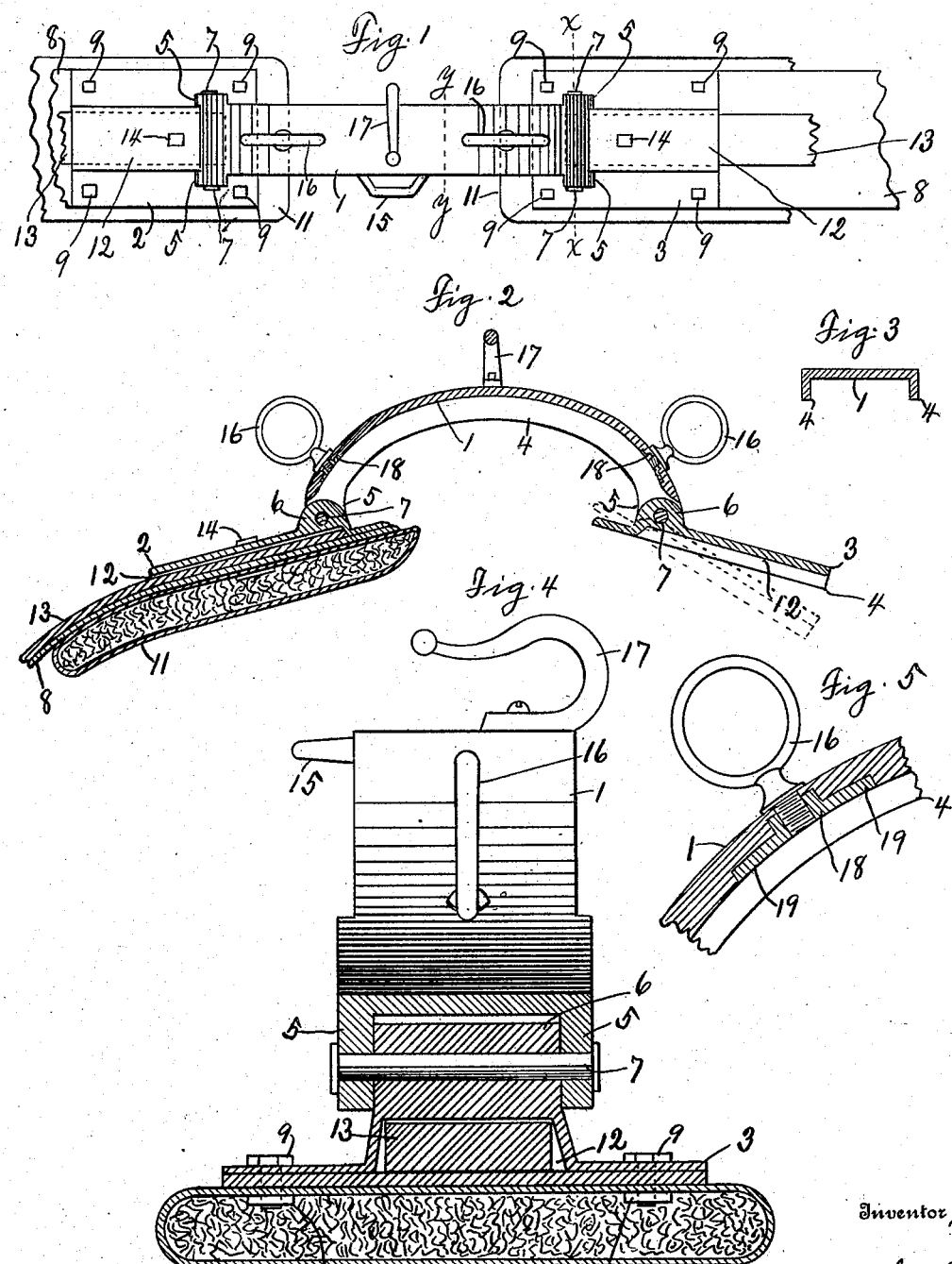
Witnesses
Guy Hartshorn
J. W. Stitt
Inventor
Frank E. Edelbrock,
By A. L. Jackson,
Attorney

UNITED STATES PATENT OFFICE.

FRANK E. EDELBROCK, OF FORT WORTH, TEXAS.

HARNESS-SADDLE.

No. 911,299.  Specification of Letters Patent.  Patented Feb. 2, 1909.

Application filed December 17, 1907. Serial No. 406,870.

*To all whom it may concern:*

Be it known that I, FRANK E. EDELBROCK, a citizen of the United States, residing at Fort Worth, in the county of Tarrant and State of Texas, have invented certain new and useful Improvements in Harness-Saddles, of which the following is a specification.

My invention relates to harness saddles and the object is to provide saddles which will not injure animals' backs and which will be automatically adjustable to a back of any size or shape.

Another object is to provide harness saddles which are simple and durable and which are easily assembled and in which the various parts are detachable so that individual parts may be renewed.

Other objects and advantages will be fully explained in the following description and the invention will be more particularly pointed out in the claim.

Reference is had to the accompanying drawings which form a part of this application and specification.

Figure 1 is a plan view of the saddle. Fig. 2 is a vertical section of the same, the pad and straps being omitted from one side. Fig. 3 is a cross-section of the arch or tree, taken along the line $y$ $y$ of Fig. 1. Fig. 4 is a vertical section, taken along the line $x$ $x$ of Fig. 1. Fig. 5 is a broken sectional view, illustrating the manner of attaching the terrets.

Similar characters of reference are used to indicate the same parts throughout the several views.

This invention is provided with a main arch or tree 1 which is preferably formed of a malleable casting. Bearing plates 2 and 3 are pivotally connected to the tree 1 and these plates are also preferably formed of malleable castings. The tree 1 has depending flanges 4 at the edges thereof to add strength to the tree. The tree 1 has downwardly projecting lugs 5 and the plates 2 and 3 have upwardly projecting bosses 6 which project up between the lugs 5 and a pivot bolt 7 connects each plate to the tree by passing through the lugs 5 and the bosses 6. The plates 2 and 3 are approximately the same width as the saddle skirts 8 and the plates and the skirts are attached together in any suitable manner, as by bolts 9 and nuts 10. The pads 11 may also be attached to the plates 2 and 3 and skirts 8 by the bolts 9. But the pads may be attached to the skirts in any suitable manner. The bearing plates 2 and 3 have pockets 12 for the shaft bearing straps 13. The bearing straps 13 may be attached to the skirts 8 or attached to the skirts 8 and to plates 2 and 3 by bolts 14. A crupper loop 15 may be formed on the tree 1. The terret rings 16 and the check rein hook 17 may be attached to the tree 1. Fig. 5 illustrates the manner of attaching the terret rings to the tree. A recess is formed in the underside of the tree and a nut 18 having extensions 19 is placed in the recess and the shank of the terret ring is screwed into the nut 18. But terret rings and check rein hooks of any ordinary construction may be attached to the saddle tree.

It will be apparent that the saddle tree will not touch the back of an animal and there will be no occasion for galling. The plates 2 and 3 are of sufficient extent to afford bearing surfaces that will not injure the sides or back of the animal and that the bearing surfaces being pivotally connected with the saddle tree will be automatically adjusted to any animal. The dotted outline in Fig. 2 indicates the position which the plate 3 might assume when the saddle is placed on an animal of a different shape. The saddle may be used with either single or double harness.

Having fully described my invention, what I claim as new and desire to secure by Letters Patent, is,—

A harness saddle having an arched tree, each wing thereof having a downwardly projecting lug on each side of the lower end thereof, a bearing plate for each wing, each bearing plate having a central raised portion integral therewith and forming a pocket in the bearing face thereof extending from the lower end approximately to the upper end thereof for inclosing the end of the bearing strap and having a perforated integral boss formed transversely on said raised portion, and a pivot bolt connecting each boss with the lugs of each wing of said arch.

In testimony whereof, I set my hand in the presence of two witnesses, this 12th day of December, 1907.

FRANK E. EDELBROCK.

Witnesses:
A. L. JACKSON,
J. W. STITT.